US012608958B2

(12) United States Patent
Inoue et al.

(10) Patent No.: US 12,608,958 B2
(45) Date of Patent: Apr. 21, 2026

(54) VEHICLE CONTROL BASED ON MAP LINE AND DETECTED LINE RELIABILITY

(71) Applicant: HONDA MOTOR CO., LTD., Tokyo (JP)

(72) Inventors: Daichi Inoue, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 18/539,535

(22) Filed: Dec. 14, 2023

(65) Prior Publication Data

US 2024/0203136 A1 Jun. 20, 2024

(30) Foreign Application Priority Data

Dec. 19, 2022 (JP) ................................. 2022-202127

(51) Int. Cl.
| | |
|---|---|
| *G06V 20/56* | (2022.01) |
| *B60W 60/00* | (2020.01) |
| *G06T 7/20* | (2017.01) |
| *G06T 7/60* | (2017.01) |
| *G06V 20/58* | (2022.01) |

(52) U.S. Cl.
CPC ......... *G06V 20/588* (2022.01); *B60W 60/005* (2020.02); *G06T 7/20* (2013.01); *G06T 7/60* (2013.01); *G06V 20/58* (2022.01); *B60W 2420/403* (2013.01); *B60W 2552/53* (2020.02); *B60W 2554/4044* (2020.02); *B60W 2556/40* (2020.02); *G06T 2207/30241* (2013.01); *G06T 2207/30256* (2013.01); *G06V 2201/08* (2022.01)

(58) Field of Classification Search
CPC ............ G06V 20/588; B60W 2556/20; B60W 2552/53; G01C 21/3658; G06T 2207/30256
See application file for complete search history.

(56) References Cited

U.S. PATENT DOCUMENTS

| | | | | |
|---|---|---|---|---|
| 10,678,261 | B2 * | 6/2020 | Baldwin | ......... B60W 30/18163 |
| 2016/0327948 | A1 * | 11/2016 | Taguchi | .............. G05D 1/0257 |
| 2018/0364734 | A1 * | 12/2018 | Ferguson | ............. G05D 1/0272 |
| 2021/0155267 | A1 * | 5/2021 | Goto | ................... B60W 30/165 |
| 2022/0266857 | A1 * | 8/2022 | Tamura | ................. G01C 21/30 |
| 2022/0315043 | A1 * | 10/2022 | Tamura | ............ B60W 60/0054 |
| 2022/0388533 | A1 * | 12/2022 | Tamura | ............ B60W 60/0059 |

FOREIGN PATENT DOCUMENTS

| | | |
|---|---|---|
| JP | 2021-004803 | 1/2021 |

* cited by examiner

*Primary Examiner* — Kenneth J Malkowski
(74) *Attorney, Agent, or Firm* — Amin, Turocy & Watson, LLP

(57) ABSTRACT

Provided is a vehicle control device configured to: acquire a camera image obtained by photographing a surrounding situation of a vehicle; generate a travelable region, which is a region in which the vehicle is capable of traveling, based on at least one of a camera road division line representing a road division line shown in the camera image and a map road division line representing a road division line stored in map information; detect a travel trajectory of another vehicle traveling ahead of the vehicle with respect to a travel direction of the vehicle; and control traveling of the vehicle such that the vehicle travels in the travelable region.

10 Claims, 7 Drawing Sheets

Figure 7:
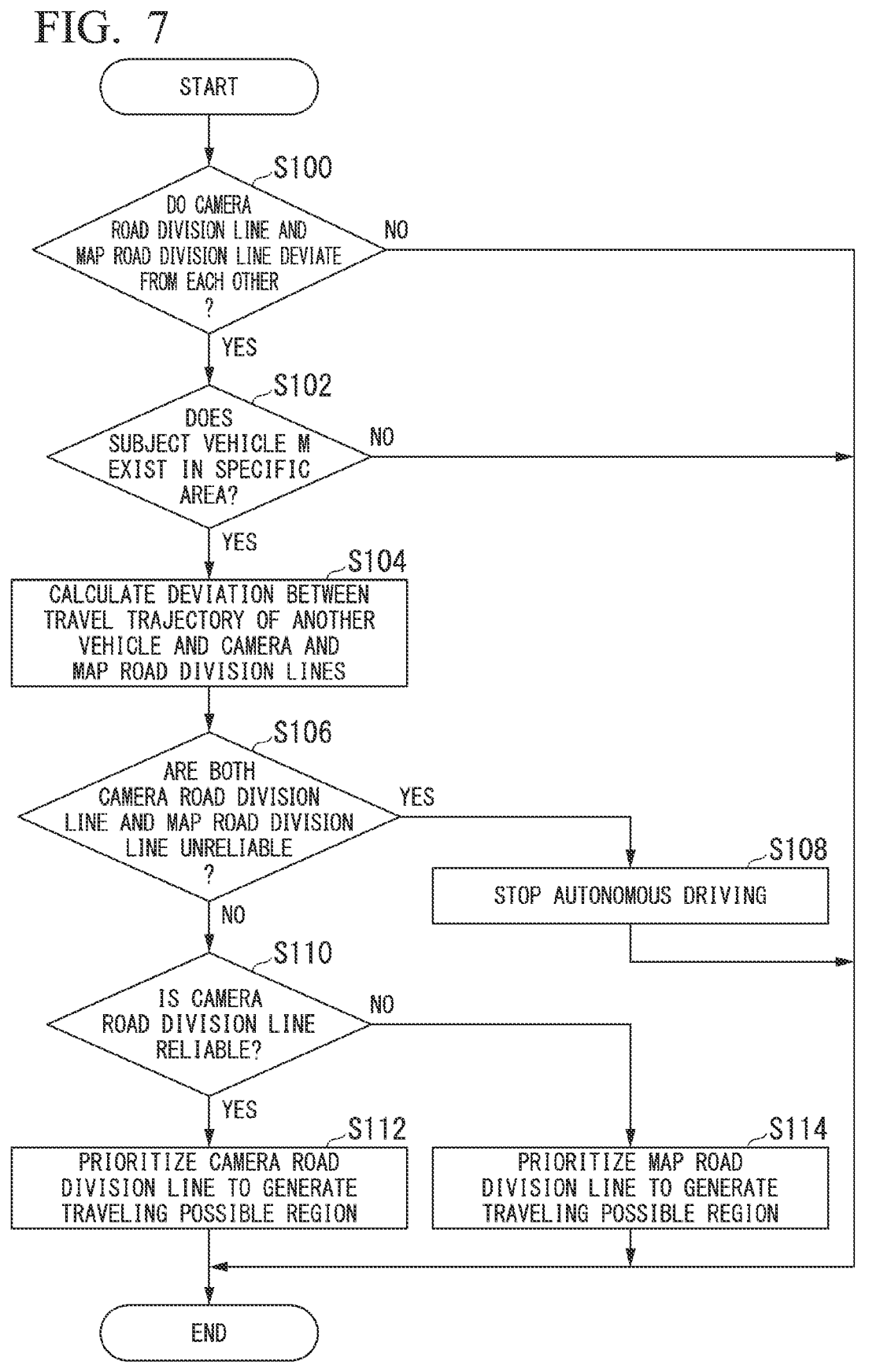

START

S100
DO CAMERA
ROAD DIVISION LINE AND
MAP ROAD DIVISION LINE DEVIATE
FROM EACH OTHER
?

NO

YES

S102
DOES
SUBJECT VEHICLE M
EXIST IN SPECIFIC
AREA?

NO

YES

S104
CALCULATE DEVIATION BETWEEN
TRAVEL TRAJECTORY OF ANOTHER
VEHICLE AND CAMERA AND
MAP ROAD DIVISION LINES

S106
ARE BOTH
CAMERA ROAD DIVISION
LINE AND MAP ROAD DIVISION
LINE UNRELIABLE
?

YES

S108
STOP AUTONOMOUS DRIVING

NO

S110
IS CAMERA
ROAD DIVISION LINE
RELIABLE?

NO

YES

S112
PRIORITIZE CAMERA ROAD
DIVISION LINE TO GENERATE
TRAVELING POSSIBLE REGION

S114
PRIORITIZE MAP ROAD
DIVISION LINE TO GENERATE
TRAVELING POSSIBLE REGION

END

VEHICLE CONTROL BASED ON MAP LINE AND DETECTED LINE RELIABILITY

CROSS-REFERENCE TO RELATED APPLICATION

The application is based on Japanese Patent Application No. 2022-202127 filed on Dec. 19, 2022, the content of which is incorporated herein by reference.

BACKGROUND

Field of the Invention

The present invention relates to a vehicle control device, a vehicle control method, and a storage medium.

Description of Related Art

Hitherto, a technology of identifying the position of a vehicle and controlling its movement based on a correlation between a camera image showing the surrounding situation captured by a vehicle-mounted camera and map information is known. For instance, Japanese Patent Application Publication No. 2021-004803 discloses a technology that determines whether the shape of a road section in which the vehicle is traveling is linear or not, and identifies a travel lane in which the vehicle is traveling when the shape of the road section is linear.

However, in the related art, in general, a relationship between a road division line in the camera image and a road division line in the map information is solely used to determine correctness of a travel path defined by either one of the road division lines. Thus, for example, when a deviation between the camera road division line and the map road division line has occurred, an error of the map road division line is detected erroneously even under a situation in which the camera road division line is erroneous in actuality, resulting in a failure to appropriately select the travel path of the vehicle.

SUMMARY

The present invention has been made in view of the above-mentioned circumstances, and has an object to provide a vehicle control device, a vehicle control method, and a storage medium, which are capable of appropriately selecting the travel path of a vehicle even when a deviation between a camera road division line and a map road division line has occurred.

A vehicle control device, a vehicle control method, and a storage medium according to the present invention adopt the following configuration.

(1): A vehicle control device including a storage medium storing computer-readable commands, and a processor connected to the storage medium, the processor being configured to execute the computer-readable commands to: acquire a camera image obtained by photographing a surrounding situation of a vehicle; generate a travelable region, which is a region in which the vehicle is capable of traveling, based on at least one of a camera road division line representing a road division line shown in the camera image and a map road division line representing a road division line stored in map information; detect a travel trajectory of another vehicle traveling ahead of the vehicle with respect to a travel direction of the vehicle; and control traveling of the vehicle such that the vehicle travels in the travelable region, in which when a deviation between the camera road division line and the map road division line has occurred, the processor prioritizes one of the camera road division line and the map road division line to generate the travelable region based on a camera deviation representing a deviation between the detected travel trajectory and the camera road division line and a map deviation between the detected travel trajectory and the map road division line.

(2) In the aspect (1), when a period in which the map road division line is prioritized has continued for a predetermined period, the processor generates the travelable region based on the map road division line without using the camera road division line.

(3): In the aspect (1), when a period in which the camera road division line is prioritized has continued for a predetermined period, the processor decreases a driving assistance level of the vehicle or increases a driving task imposed on a driver of the vehicle, or when a period in which the map road division line is prioritized has continued for a predetermined period, the processor maintains the driving assistance level or the driving task.

(4): In the aspect (1), the processor calculates an angle formed by the detected travel trajectory and the camera road division line as the camera deviation, and calculates an angle formed by the detected travel trajectory and the map road division line as the map deviation.

(5): In the aspect (1), the processor detects the travel trajectory for each of a plurality of other vehicles, and calculates the camera deviation and the map deviation for each of the plurality of other vehicles.

(6): In the aspect (4), the processor calculates, as the camera deviation, a larger one of angles formed by the detected travel trajectory and the camera road division lines on both sides, and calculates, as the map deviation, a larger one of angles formed by the detected travel trajectory and the map road division lines on both sides.

(7): In the aspect (5), the processor determines which one of the camera road division line and the map road division line to prioritize based on the camera deviation and the map deviation calculated for another vehicle closest to the vehicle with respect to the travel direction of the vehicle among a plurality of other vehicles for which the travel trajectory has been detected.

(8): In the aspect (1), when a deviation between the camera road division line and the map road division line has occurred and the vehicle exists in a specific area, the processor prioritizes one of the camera road division line and the map road division line to generate the travelable region based on the camera deviation and the map deviation.

(9): In the aspect (1), the processor determines reliability of the camera road division line and reliability of the map road division line independently of each other, and prioritizes one of the camera road division line and the map road division line to generate the travelable region according to a result of determination.

(10): A vehicle control method according to an aspect of the present invention is a vehicle control method to be executed by a computer, the vehicle control method including: acquiring a camera image obtained by photographing a surrounding situation of a vehicle; generating a travelable region, which is a region in which the vehicle is capable of traveling, based on at least one of a camera road division line representing a road division line shown in the camera image and a map road division line representing a road division line stored in map information; detecting a travel trajectory of another vehicle traveling ahead of the vehicle with respect to a travel direction of the vehicle; controlling traveling of the vehicle such that the vehicle travels in the travelable region; and prioritizing, when a deviation between the camera road division line and the map road division line has occurred, one of the camera road division line and the map road division line to generate the travelable region based on a camera deviation representing a deviation between the detected travel trajectory and the camera road division line and a map deviation between the detected travel trajectory and the map road division line.

(11): A non-transitory computer-readable storage medium according to an aspect of the present invention is a non-transitory computer-readable storage medium storing a program for causing to a computer to: acquire a camera image obtained by photographing a surrounding situation of a vehicle; generate a travelable region, which is a region in which the vehicle is capable of traveling, based on at least one of a camera road division line representing a road division line shown in the camera image and a map road division line representing a road division line stored in map information; detect a travel trajectory of another vehicle traveling ahead of the vehicle with respect to a travel direction of the vehicle; and control traveling of the vehicle such that the vehicle travels in the travelable region; wherein when a deviation between the camera road division line and the map road division line has occurred, the computer prioritizes one of the camera road division line and the map road division line to generate the travelable region based on a camera deviation representing a deviation between the detected travel trajectory and the camera road division line and a map deviation between the detected travel trajectory and the map road division line.

According to the aspects (1) to (11), it is possible to appropriately select the travel path of a vehicle even when a deviation between a camera road division line and a map road division line has occurred.

BRIEF DESCRIPTION OF THE DRAWINGS

FIG. 4 is another diagram for describing a method of determining which one of the camera road division line and the map road division line to prioritize by the travelable region generation unit.

FIG. 7 is a flow chart for illustrating an example of a flow of processing to be executed by the vehicle control device.

DESCRIPTION OF EMBODIMENTS

Now, a vehicle control device, a vehicle control method, and a storage medium according to an embodiment of the present invention are described with reference to the drawings.

[Overall Configuration]

Figure 1:
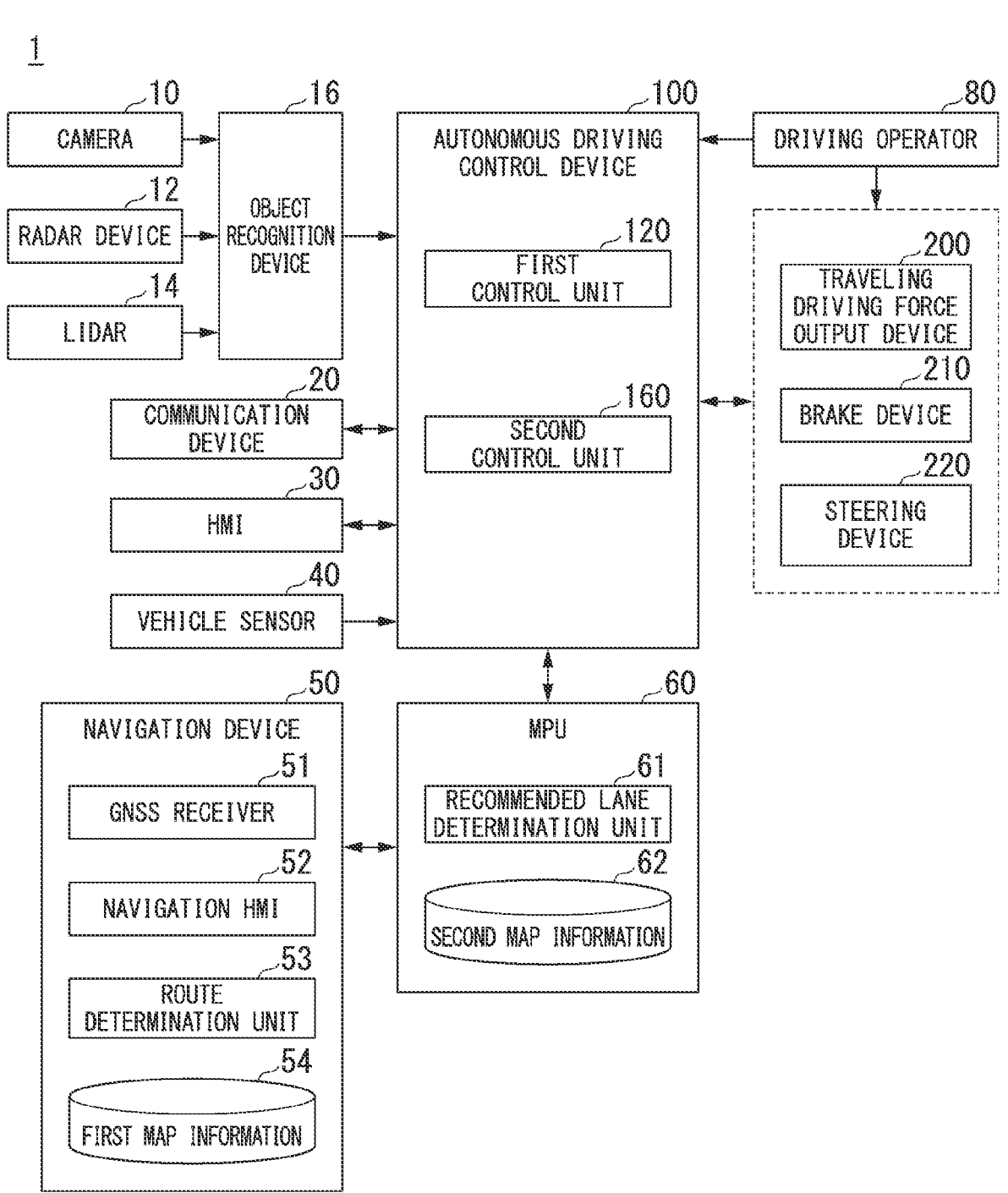
FIG. 1 is a configuration diagram of a vehicle system that uses a vehicle control device according to an embodiment.

FIG. 1 is a configuration diagram of a vehicle system 1 that uses a vehicle control device according to an embodiment. A vehicle including the vehicle system 1 is, for example, a vehicle such as a two-wheeled vehicle, a three-wheeled vehicle, or a four-wheeled vehicle, and its power source is an internal combustion engine such as a diesel engine or a gasoline engine, an electric motor, or a combination thereof. The electric motor operates by using power generated by a generation unit connected to the internal combustion engine or power discharged by a secondary battery or a fuel cell.

The vehicle system 1 includes, for example, a camera 10, a radar device 12, a LIDAR (Light Detection and Ranging) device 14, an object recognition device 16, a communication device 20, an HMI (Human Machine Interface) 30, a vehicle sensor 40, a navigation device 50, an MPU (Map Positioning Unit) 60, a driving operator 80, an autonomous driving control device 100, a driving force output device 200, a braking device 210, and a steering device 220. These devices and instruments are connected to one another via, for example, a wireless communication line, a serial communication line, or a multiplex communication line such as a CAN (Control unit Area Network) communication line. The configuration illustrated in FIG. 1 is only one example, and a part of the configuration may be omitted, or another configuration may be added. The autonomous driving control device 100 is an example of "vehicle control device".

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "subject vehicle M") including the vehicle system 1. When the camera 10 picks up a front image, the camera 10 is mounted on, for example, an upper part of a front windshield or a back surface of a rear-view mirror. The camera 10 repeatedly photographs the surroundings of the subject vehicle M periodically, for example. The camera 10 may be a stereo camera.

The radar device 12 radiates a radio wave such as a millimeter wave toward the surroundings of the subject vehicle M, and detects a radio wave (reflected wave) reflected by an object, to detect at least the position (distance and direction) of the object. The radar device 12 is mounted on any part of the subject vehicle M. The radar device 12 may detect the position and speed of the object by an FM-CW (Frequency Modulated Continuous Wave) method.

The LIDAR 14 radiates light (or electromagnetic wave having a wavelength close to light) toward the surroundings of the subject vehicle M, and measures diffused light. The LIDAR 14 detects a distance to a target based on a period of time since emission of light until reception of light. The light to be radiated is, for example, pulsed laser light. The LIDAR 14 is mounted on any part of the subject vehicle M.

The object recognition device 16 executes sensor fusion processing for results of detection by a part or all of the camera 10, the radar device 12, and the LIDAR 14, to thereby recognize a position, a type, and a speed of an object, for example. The object recognition device 16 outputs the recognition result to the automatic driving control device 100. The object recognition device 16 may output the results of detection by the camera 10, the radar device 12, and the LIDAR 14 to the automatic driving control device 100 as they are. The object recognition device 16 may be omitted from the vehicle system 1.

The communication device 20 uses, for example, a cellular network, a Wi-Fi network, Bluetooth (trademark), or DSRC (Dedicated Short Range Communication) to communicate with another vehicle existing near the subject vehicle M or communicate with various kinds of server devices via a radio base station.

The HMI 30 presents various kinds of information to an occupant of the subject vehicle M, and receives input of an operation by the occupant. The HMI 30 includes, for example, various kinds of display devices, speakers, buzzers, touch panels, switches, and keys.

The vehicle sensor 40 includes, for example, a vehicle speed sensor that detects a speed of the subject vehicle M, an acceleration sensor that detects an acceleration, a yaw rate sensor that detects an angular speed with respect to a vertical axis, and an orientation sensor that detects an orientation of the subject vehicle M.

The navigation device 50 includes, for example, a GNSS (Global Navigation Satellite System) receiver 51, a navigation HMI 52, and a route determination unit 53. The navigation device 50 holds first map information 54 in a storage device such as an HDD (Hard Disk Drive) or a flash memory. The GNSS receiver 51 identifies the position of the subject vehicle M based on a signal received from a GNSS satellite. The position of the subject vehicle M may be identified or complemented by an INS (Inertial Navigation System) that uses output of the vehicle sensor 40. The navigation HMI 52 includes, for example, a display device, a speaker, a touch panel, and a key. The navigation HMI 52 and the HMI 30 described above may be integrated partially or completely. The route determination unit 53 refers to the first map information 54 to determine a route (hereinafter referred to as "map route") from the position (or any input position) of the subject vehicle M identified by the GNSS receiver 51 to a destination input by an occupant by using the navigation HMI 52, for example. The first map information 54 is, for example, information representing road structure by a link indicating a road and nodes connected by the link. The first map information 54 may include, for example, a curvature of a road and POI (Point Of Interest) information. The map route is output to the MPU 60. The navigation device 50 may guide a route by using the navigation HMI 52 based on the map route. The navigation device 50 may be implemented by, for example, the function of a terminal device such as a smartphone or a tablet terminal held by the occupant. The navigation device 50 may transmit the current position and the destination to a navigation server via the communication device 20, and acquire a route similar to the map route from the navigation server.

The MPU 60 includes, for example, a recommended lane determination unit 61, and holds second map information 62 in a storage device such as an HDD or a flash memory. The recommended lane determination unit 61 divides the map route provided by the navigation device 50 into a plurality of blocks (for example, at intervals of 100 [m] with respect to a vehicle travel direction), and determines a recommended route for each block with reference to the second map information 62. The recommended lane determination unit 61 determines on which lane the subject vehicle M is to travel. When there is a junction on a map route, the recommended lane determination unit 61 determines a recommended route so that the subject vehicle M can travel on a route for efficiently entering the junction.

The second map information 62 is map information having higher precision than that of the first map information 54. The second map information 62 includes, for example, information on the center of a lane or information on the boundary of a lane. The second map information 62 may further include, for example, road information, traffic regulation information, address information (address or postal code), facility information, and phone number information. The second map information 62 may be updated appropriately through communication between the communication device 20 and another device.

The driving operator 80 includes, for example, an acceleration pedal, a brake pedal, a gear shift, and other control units in addition to the steering wheel 82. A sensor that detects an operation amount or whether an operation is applied is mounted on the driving operator 80, and the detection result is output to the automatic driving control device 100 or a part or all of the driving force output device 200, the braking device 210, and the steering device 220.

The automatic driving control device 100 includes, for example, a first control unit 120 and a second control unit 160. The first control unit 120 and the second control unit 160 are each implemented by a hardware processor such as a CPU (Central Processing Unit) executing a program (software). A part or all of the components may be implemented by hardware (circuit; including circuitry) such as an LSI (Large Scale Integration), an ASIC (Application Specific Integrated Circuit), an FPGA (Field-Programmable Gate Array), or a GPU (Graphics Processing Unit), or may be implemented by cooperation between software and hardware. The program may be stored in advance in a storage device (storage device including a non-transitory storage medium) of the automatic driving control device 100 such as an HDD or a flash memory, or the program may be stored in a removable storage medium such as a DVD or a CD-ROM. Then, the storage medium (non-transitory storage medium) may be mounted on a drive device so that the program is installed into an HDD or a flash memory of the automatic driving control device 100.

Figure 2:
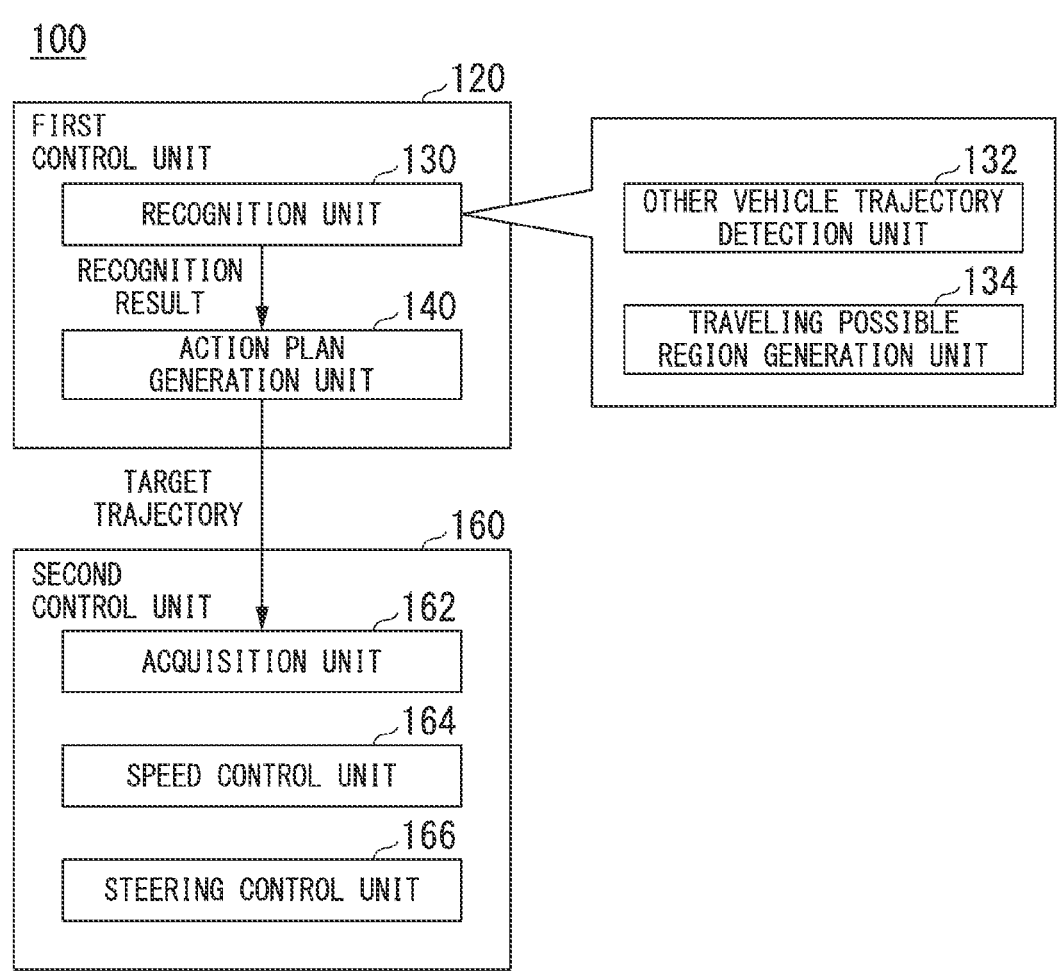
FIG. 2 is a diagram illustrating an example of a first control unit and a second control unit.

FIG. 2 is a functional configuration diagram of the first control unit 120 and the second control unit 160. The first control unit 120 includes, for example, a recognition unit 130 and an action plan generation unit 140. The first control unit 120 implements, for example, the function of AI (Artificial Intelligence) and the function of a model given in advance in parallel. For example, the function of "recognizing an intersection" may be implemented by executing recognition of an intersection by, for example, deep learning, and recognition based on a condition (including, for example, a signal adapted for pattern matching and a road sign) given in advance in parallel, giving scores to both of the recognitions, and giving an integrated evaluation. The reliability of automatic driving is ensured in this manner.

The recognition unit 130 recognizes states such as the position, speed, and acceleration of an object near the subject vehicle M based on information input from the camera 10, the radar device 12, and the LIDAR 14 via the object recognition device 16. The position of an object is, for example, recognized as a position in an absolute coordinate system with respect to a representative point (for example, center of gravity or center of drive axis) of the subject vehicle M to be used for control. The position of an object may be represented by a representative point such as a center of gravity or corner of the object, or may be represented by a region. The "state" of an object may include the acceleration, jerk, or "action state" (for example, whether or not the subject vehicle M is changing a lane or is trying to change a lane) of the object.

The recognition unit 130 recognizes, for example, a lane (travel lane) on which the subject vehicle M is traveling. For example, the recognition unit 130 recognizes the travel lane by comparing a pattern (for example, arrangement of solid lines and broken lines) of a road division line obtained from the second map information 62 with a pattern of a road division line near the subject vehicle M recognized from the image photographed by the camera 10, to thereby recognize the travel lane. In addition to the road division line, the recognition unit 130 may recognize the travel lane by recognizing a travel path boundary (road boundary) including, for example, a road division line, the shoulder of a road, a curb, a center median, and a guardrail. In this recognition, the position of the subject vehicle M acquired from the navigation device 50 or the result of processing by the INS may be considered. The recognition unit 130 recognizes a stop line, an obstacle, red light, a toll gate, and other road events.

The recognition unit 130 recognizes the position or posture of the subject vehicle M with respect to a travel lane when recognizing the travel lane. The recognition unit 130 may recognize, for example, as the relative position and posture of the subject vehicle M with respect to the travel lane, a deviation of the reference point of the subject vehicle M from the center of the lane and an angle with respect to a line obtained by connecting the centers of the lane in the travel direction of the subject vehicle M. Instead, the recognition unit 130 may recognize, for example, the position of the reference point of the subject vehicle M with respect to any side edge (road division line or road boundary) of the travel lane as the relative position of the subject vehicle M with respect to the travel lane. The recognition unit 130 includes an other vehicle trajectory detection unit 132 and a travelable region generation unit 134.

The other vehicle trajectory detection unit 132 detects a travel trajectory of another vehicle traveling ahead of the subject vehicle M recognized by the recognition unit 130 with respect to the travel direction of the subject vehicle M. More specifically, for example, the other vehicle trajectory detection unit 132 acquires the positions of each other vehicle traveling ahead of the subject vehicle M as a point cloud at predetermined control cycles, and then detects the travel trajectory of the respective other vehicles by connecting the acquired point clouds.

The travelable region generation unit 134 generates a travelable region, which is a region in which the subject vehicle M is capable of traveling, based on at least one of a road division line recognized from an image photographed by the camera 10 (hereinafter referred to as "camera road division line") and a road division line included in the second map information 62 (hereinafter referred to as "map road division line"). For example, the travelable region generation unit 134 can generate a travelable region as a region sandwiched by the recognized camera road division lines on both sides, or can generate a travelable region as a region sandwiched by road division lines on both sides included in the second map information 62. As described later, the travelable region generation unit 134 prioritizes one of the camera road division line and the map road division line based on deviations between the travel trajectory of another vehicle detected by the other vehicle trajectory detection unit 132 and the camera and map road division lines.

The action plan generation unit 140 generates a target trajectory in which the subject vehicle M is to travel in the future (without depending on an operation performed by the driver) automatically so as to be capable of traveling on a recommended lane determined by the recommended lane determination unit 61 in principle and coping with the surrounding situation of the subject vehicle M. The target trajectory is also generated such that the subject vehicle M passes through the travelable region generated by the travelable region generation unit 134. The target trajectory includes, for example, a speed component. For example, the target trajectory is represented by arranging the locations (trajectory points) to be reached by the subject vehicle M. The trajectory points are locations to be reached by the subject vehicle M at predetermined travelled distances (for example, about several meters) along the road. In addition, a target speed and a target acceleration are generated in each predetermined sampling period (for example, less than 1 second) as a part of the target trajectory. The trajectory points may be positions to be reached by the subject vehicle M in each sampling period. In this case, information on the target speed and the target acceleration is represented by an interval between trajectory points.

The action plan generation unit 140 may set an automatic driving event when generating a target trajectory. The automatic driving event includes, for example, a constant speed traveling event, a low-speed following traveling event, a lane change event, a junction event, a merge event, and a takeover event. The action plan generation unit 140 generates a target trajectory that depends on an activated event.

The second control unit 160 controls the driving force output device 200, the braking device 210, and the steering device 220 so that the subject vehicle M passes through the target trajectory generated by the action plan generation unit 140 as scheduled.

Referring back to FIG. 2, the second control unit 160 includes, for example, an acquisition unit 162, a speed control unit 164, and a steering control unit 166. The acquisition unit 162 acquires information on a target trajectory (trajectory points) generated by the action plan generation unit 140, and stores the information into a memory (not shown). The speed control unit 164 controls the driving force output device 200 or the braking device 210 based on a speed component accompanying the target trajectory stored in the memory. The steering control unit 166 controls the steering device 220 depending on the degree of curve of the target trajectory stored in the memory. The processing of the speed control unit 164 and the steering control unit 166 is implemented by a combination of feed-forward control and feedback control. As an example, the steering control unit 166 executes feed-forward control that depends on the curvature of the road in front of the subject vehicle M and feedback control based on a deviation from the target trajectory.

The driving force output device 200 outputs, to a drive wheel, a traveling driving force (torque) for causing the subject vehicle M to travel. The driving force output device 200 includes, for example, a combination of an internal combustion engine, an electric motor, and a transmission, and an ECU (Electronic Control Unit) configured to control these components. The ECU controls the above-mentioned components in accordance with information input from the second control unit 160 or information input from the driving control unit 80.

The braking device 210 includes, for example, a brake caliper, a cylinder that transmits a hydraulic pressure to the brake caliper, an electric motor that causes the hydraulic pressure in the cylinder, and a brake ECU. The brake ECU controls the electric motor in accordance with information input from the second control unit 160 or information input from the driving control unit 80, and causes a brake torque that depends on a braking operation to be output to each wheel. The braking device 210 may include, as a backup, a mechanism for transmitting the hydraulic pressure, which is caused by an operation of the brake pedal included in the driving control unit 80, to the cylinder via a master cylinder.

The configuration of the braking device 210 is not limited to the configuration described above, and the braking device 210 may be an electronic hydraulic brake device configured to control an actuator in accordance with information input from the second control unit 160, and transmit the hydraulic pressure of the master cylinder to the cylinder.

The steering device 220 includes, for example, a steering ECU and an electric motor. The electric motor causes a force in a rack-and-pinion mechanism to change the orientation of a steered wheel. The steering ECU drives the electric motor in accordance with information input from the second control unit 160 or information input from the driving control unit 80 to change the orientation of the steered wheel.

[Operation of Travelable Region Generation Unit]

When a deviation between the camera road division line and the map road division line has occurred, the travelable region generation unit 134 prioritizes one of the camera road division line and the map road division line to generate the travelable region based on deviations between the travel trajectory of another vehicle detected by the other vehicle trajectory detection unit 132 and the camera and map road division lines. The processing of prioritizing one of the camera road division line and the map road division line to generate a travelable region is executed when the travelable region generation unit 134 has detected a deviation between the camera road division line and the map road division line in a specific area (that is, location where deviation between camera information and map information is likely to occur) such as a branching road, a merging road, and the entrance of a tunnel. The deviation between the camera road division line and the map road division line means, for example, a case where the sum of distances between a point cloud forming the camera road division line and a point cloud forming the map road division line is equal to or larger than a threshold value. Whether or not the subject vehicle M exists in a specific area may be determined based on the camera image or the second map information 62, for example.

Figure 3:
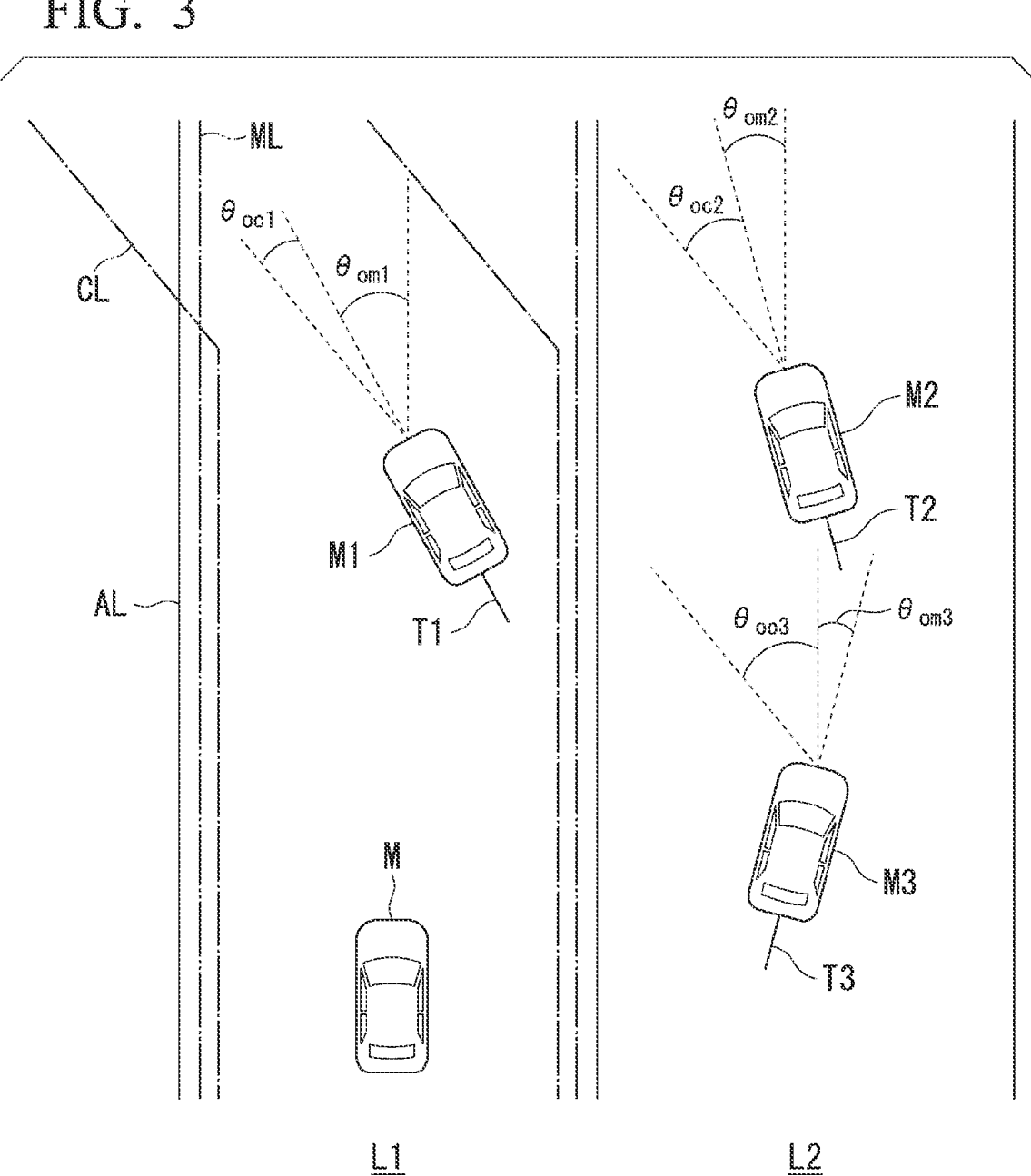
FIG. 3 is a diagram for describing a method of determining which one of a camera road division line and a map road division line to prioritize by a travelable region generation unit.

FIG. 3 is a diagram for describing a method of determining which one of the camera road division line and the map road division line to prioritize by the travelable region generation unit 134. In FIG. 3, the reference symbol ML represents map road division lines, the reference symbol CL represents camera road division lines, the reference symbol AL represents actual road division lines, the reference symbols M1 to M3 represent other vehicles traveling ahead of the subject vehicle M with respect to the travel direction, and the reference symbols T1 to T3 represent the travel trajectories of other vehicles M1 to M3 detected by the other vehicle trajectory detection unit 132.

First, the travelable region generation unit 134 calculates deviations between the travel trajectories T1 to T3, and the camera road division line CL and the map road division line ML for each of the detected other vehicles M1 to M3. For example, in the case of FIG. 3, the travelable region generation unit 134 calculates a camera deviation $\theta_{oc1}$ between the travel trajectory T1 and the camera road division line CL, and calculates a map deviation $\theta_{om1}$ between the travel trajectory T1 and the map road division line ML for the vehicle M1. The travelable region generation unit 134 further calculates a camera deviation $\theta_{oc2}$ between the travel trajectory T2 and the camera road division line CL, and calculates a map deviation $\theta_{om2}$ between the travel trajectory T2 and the map road division line ML for the vehicle M2. The travelable region generation unit 134 further calculates a camera deviation $\theta_{oc3}$ between the travel trajectory T3 and the camera road division line CL, and calculates a map deviation $\theta_{om3}$ between the travel trajectory T3 and the map road division line ML for the vehicle M3. For example, the travelable region generation unit 134 calculates those deviations as a positive value when the road division line has deviated clockwise with respect to the travel trajectory, or as a negative value when the road division line has deviated counterclockwise.

Figure 4:
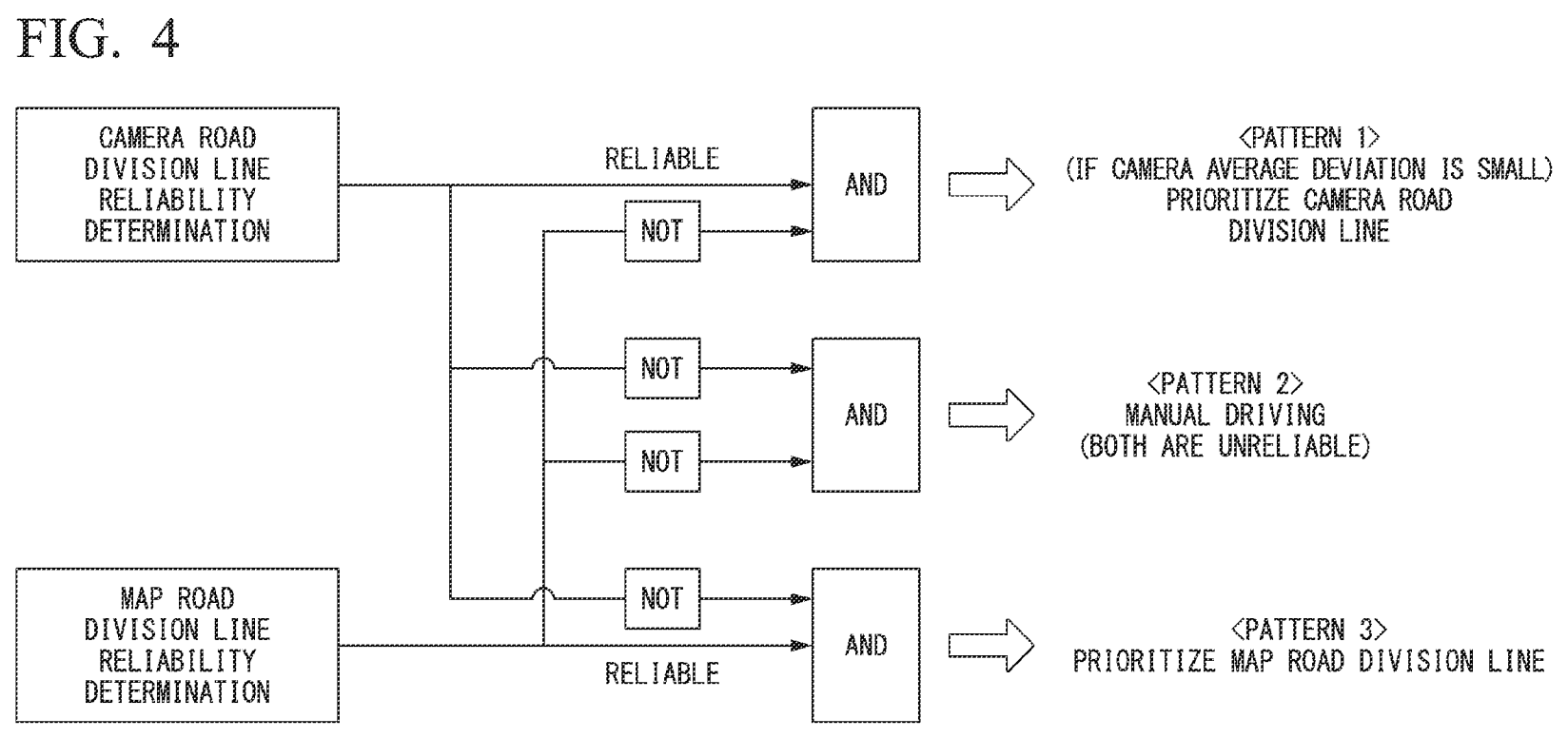

After the travelable region generation unit 134 calculates the camera deviations $\theta_{oc1}$ to $\theta_{oc3}$, and the map deviations $\theta_{om1}$ to $\theta_{om3}$ for the detected other vehicles M1 to M3, the travelable region generation unit 134 next uses these values to determination uniteliability of the camera road division line CL and reliability of the map road division line ML independently of each other. FIG. 4 is another diagram for describing a method of determining which one of the camera road division line and the map road division line to prioritize by the travelable region generation unit 134. In order to determination uniteliability of the camera road division line CL and the map road division line ML, the travelable region generation unit 134 uses the camera deviations $\theta_{oc1}$ to $\theta_{oc3}$ calculated for the detected other vehicles M1 to M3 to calculate a camera average deviation between the camera road division line CL and the travel trajectories of all the other vehicles as an average value $\theta_{ocAve}=(|\theta_{oc1}|+|\theta_{oc2}|+|\theta_{oc3}|)/3$ of the camera deviations $\theta_{oc1}$ to $\theta_{oc3}$. Further, the travelable region generation unit 134 uses the map deviations $\theta_{om1}$ to $\theta_{om3}$ calculated for the detected other vehicles M1 to M3 to calculate a map average deviation between the map road division line ML and the travel trajectories of all the other vehicles as an average value $\theta_{omAve}=(|\theta_{om1}|+|\theta_{om2}|+|\theta_{om3}|)/3$ of the map deviations $\theta_{om1}$ to $\theta_{om3}$. That is, the camera average deviation $\theta_{ocAve}$ represents a deviation between the camera road division line CL and the travel trajectories of all the other vehicles, and the map average deviation $\theta_{omAve}$ represents a deviation between the map road division line ML and the travel trajectories of all the other vehicles.

Then, the travelable region generation unit 134 calculates a difference $dif_{oc-om}=$camera average deviation $\theta_{ocAve}$-map average deviation $\theta_{omAve}$, and if the $dif_{oc-om}$ is equal to or larger than a threshold value, the travelable region generation unit 134 determines that the map road division line ML is reliable.

On the other hand, the travelable region generation unit 134 calculates a difference $dif_{om-oc}=$map average deviation $\theta_{omAve}$-camera average deviation $\theta_{ocAve}$, and if the $dif_{om-oc}$ is equal to or larger than a threshold value, the travelable region generation unit 134 determines that the camera road division line CL is reliable.

This determination is made to determine toward which one of the camera road division line CL and the map road division line ML the travel trajectories of all the other vehicles are inclined. Thus, as an additional condition, the travelable region generation unit 134 determines whether or not a predetermined number (e.g., a majority) of the calculated camera deviations $\theta_{oc1}$ to $\theta_{oc3}$ is equal to or smaller than a threshold value, and if the predetermined number is determined to be equal to or smaller than the threshold value, the camera road division line CL is determined to be reliable. Similarly, the travelable region generation unit 134 determines whether or not a predetermined number (e.g., a majority) of the calculated map deviations $\theta_{om1}$ to $\theta_{om3}$ is equal to or smaller than a threshold value, and if the predetermined number is determined to be equal to or smaller than the threshold value, the map road division line ML is determined to be reliable. By setting this additional condition to the determination, the accuracy of the reliability determination can be improved compared to the conventional determination based only on the relationship between the camera road division line CL and the map road division line ML.

If the reliability determination result shows that the camera road division line CL is reliable and the map road division line ML is unreliable (pattern 1 in FIG. 4), the travelable region generation unit 134 determines to prioritize the camera road division line CL and generates the travelable region based on the camera road division line CL. In this case, the travelable region generation unit 134 may determine whether or not the camera average deviation $\theta_{ocAve}$ is equal to or smaller than a threshold value, and may determine to prioritize the camera road division line CL only when the camera average deviation $\theta_{ocAve}$ is determined to be equal to or smaller than the threshold value. Furthermore, the travelable region generation unit 134 decreases the level of support for autonomous driving (driver assistance) of the vehicle M or increases the number of driving tasks imposed on the driver of the vehicle M if the period during which the camera road division line CL is prioritized (the period during which the condition is satisfied) continues for a predetermined period. More specifically, for example, the task of grasping the steering wheel of the driving operator 80 is changed from a state in which the task of grasping the steering wheel is not imposed to a state in which the task of grasping the steering wheel is imposed in autonomous driving.

If the reliability determination result shows that both of the camera road division line CL and the map road division line ML are unreliable (pattern 2 in FIG. 4), the travelable region generation unit 134 stops autonomous driving without generating the travelable region, and causes the driver to perform manual driving of the subject vehicle M.

If the reliability determination result shows that the map road division line ML is reliable and the camera road division line CL is unreliable (pattern 3 in FIG. 4), the travelable region generation unit 134 determines to prioritize the map road division line ML, and generates the travelable region based on the map road division line ML. In this case, the travelable region generation unit 134 may generate the travelable region based on the map road division line ML without using (discarding) the camera road division line CL only when the period during which the map road division line ML is prioritized (the period during which the condition is satisfied) continues for a predetermined period. In this case, unlike the patterns 1 and 2 in FIG. 4, the assistance level of autonomous driving (driver assistance) of the vehicle M or the driving task imposed on the driver of the vehicle M is maintained, and autonomous driving of the vehicle M is continued; more specifically, for example, the task of grasping the steering wheel of the driving operator 80 is not imposed in the autonomous driving.

In FIG. 3 above, the case where the deviation between the camera road division line CL and the map road division line ML is the same for both sides is explained. When the deviation between the camera road division line CL and the map road division line ML is not the same for both sides, the travelable region generation unit 134 calculates the camera deviation and the map deviation by using the camera road division line CL and the map road division line ML on a larger-deviation side.

Figure 5:
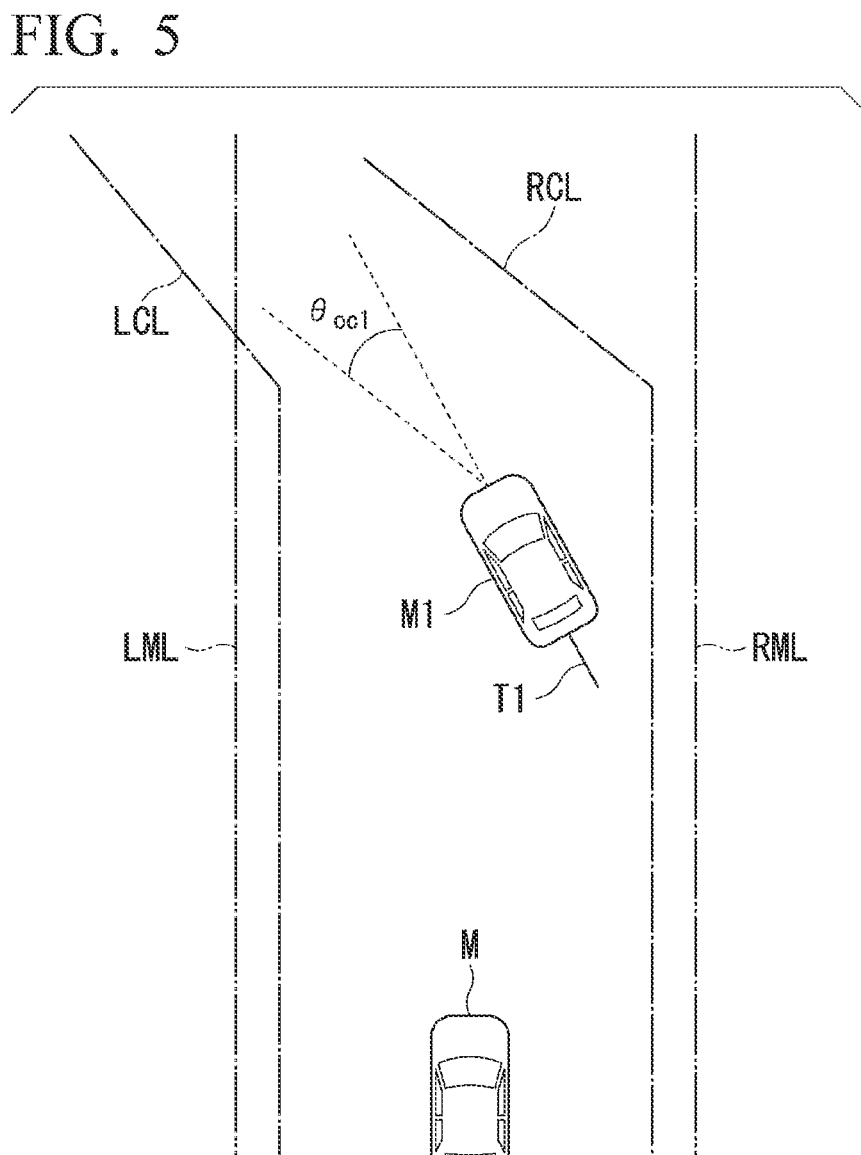
FIG. 5 is a diagram for describing processing in a case where a deviation between the camera road division line and the map road division line is not the same for both sides.

FIG. 5 is a diagram for describing processing in a case where a deviation between the camera road division line and the map road division line is not the same for both sides. FIG. 5 shows the case where, for the vehicle M1, the deviation between the right camera road division line RCL and the right map road division line RML is larger than the deviation between the left camera road division line LCL and the left map road division line LML In this case, for the vehicle M1, the travelable region generation unit 134 calculates the deviation between the travel trajectory T1 and the camera road division line RCL on the right side as the camera deviation $\theta_{oc1}$, and calculates the deviation between the travel trajectory T1 and the map road division line RML on the right side as the map deviation $\theta_{om1}$.

When the deviation between the camera road division line CL and the map road division line ML is not the same for both sides, this is mainly due to the tendency of difference in the camera road division line CL between both sides. Thus, it is possible to reduce the possibility of executing the above processing to erroneously prioritize the camera road division line at the time of erroneous camera recognition.

Furthermore, FIG. 3 above describes an example of determining the reliability of camera road division line CL and the map road division line ML by calculating the deviations for all other vehicles traveling ahead with respect to the direction of travel of the subject vehicle M. However, the present invention is not limited to such a configuration, and the deviation may be calculated only for other vehicles that are more important for the generation of the travelable region of the subject vehicle M among the other vehicles traveling ahead of the subject vehicle M.

Figure 6:
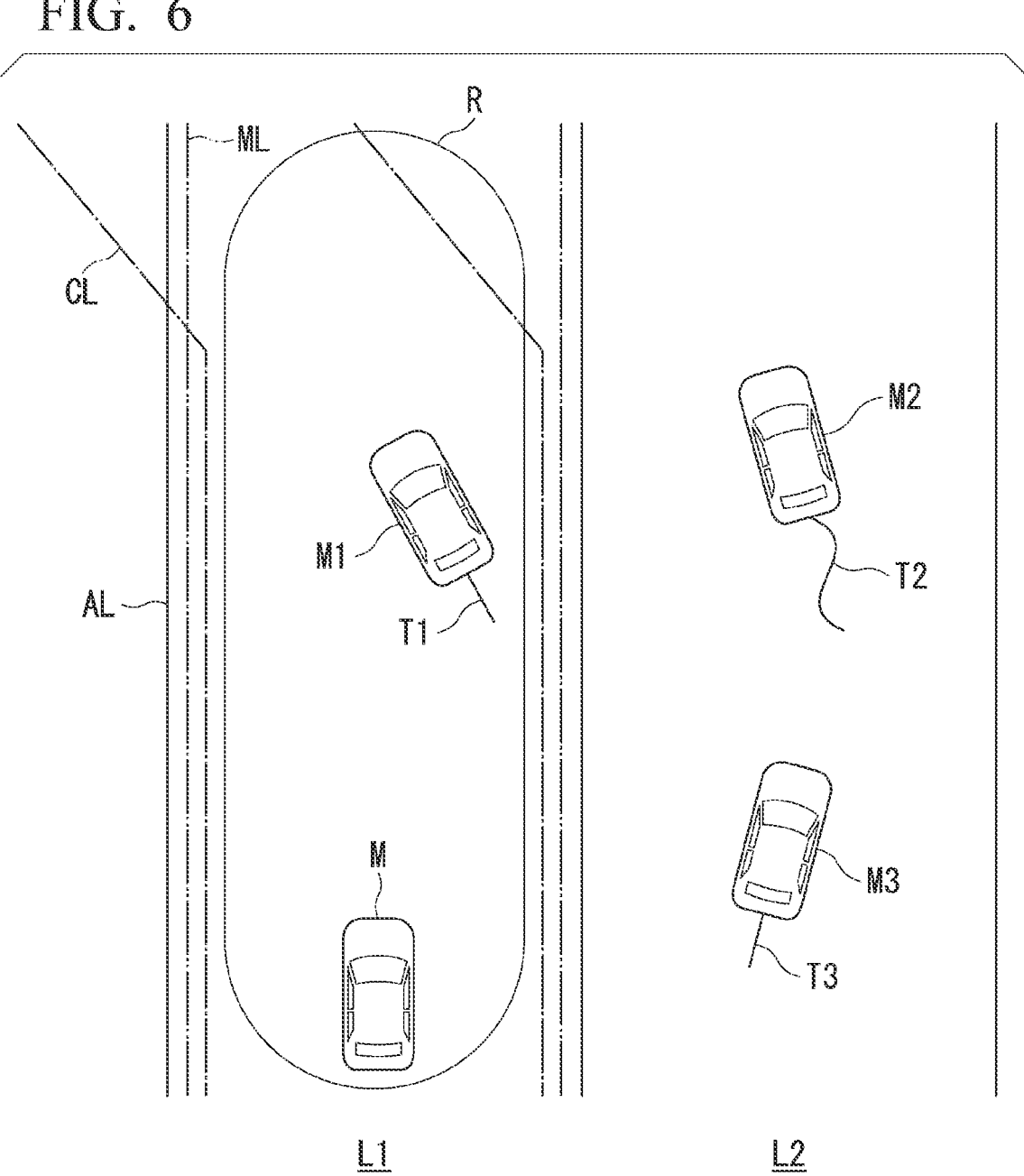
FIG. 6 is a diagram for describing a method of selecting another vehicle for which the deviation is to be calculated.

FIG. 6 is a diagram for describing a method of selecting another vehicle for which the deviation is to be calculated. As illustrated in the range R of FIG. 6, the travelable region generation unit 134 may, for example, calculate the deviation only for other vehicles (in FIG. 6, other vehicle T1) that travel ahead with respect to the direction of travel of the host M and are within a predetermined distance from the subject vehicle M, and determine which of the camera road division line CL and map road division line ML to prioritize. In addition, for example, the travelable region generation unit 134 may calculate the deviation only for other vehicles (in FIG. 6, other vehicles T1 and T3) with a travel trajectory whose curvature is below a threshold (i.e., close to a straight line), and determine which of the camera road division line CL and map road division line ML to prioritize. By setting this additional condition, it is possible to determine the reliability of the camera road division line CL and the map road division line ML more reliably.

The travelable region generation unit 134 may execute the reliability determination for the vehicles T1 to T3 of FIG. 3, and execute the reliability determination for the preceding vehicle T1 of FIG. 6, and determine the reliability of the camera road division line CL and the map road division line ML according to whether or not both determination conditions are satisfied. Furthermore, the above explanation describes the processing when there are three other vehicles in front of the subject vehicle M. However, the present invention is not limited to such a configuration, and the above processing may be executed when there are at least two or more other vehicles (or preceding vehicles) in front of the own vehicle M.

Next, description is given of a flow of processing to be executed by the vehicle control device with reference to FIG. 7. FIG. 7 is a flow chart for illustrating an example of a flow of processing to be executed by the vehicle control device. The processing illustrated in FIG. 7 is repeatedly executed while the subject vehicle M is traveling, for example.

First, the travelable region generation unit 134 determines whether a deviation between the camera road division line CL and the map road division line ML has occurred (Step S100). When it is determined that a deviation between the camera road division line CL and the map road division line ML has not occurred, the travelable region generation unit 134 finishes the processing of this flow chart. On the other hand, when it is determined that a deviation between the camera road division line CL and the map road division line ML has not occurred, the travelable region generation unit 134 determines whether or not the subject vehicle M exists in a specific area (Step S102). When it is determined that the subject vehicle M does not exist in the specific area, the travelable region generation unit 134 finishes the processing of this flow chart.

On the other hand, when it is determined that the subject vehicle M exists in the specific area, the travelable region generation unit 134 calculates deviations between the travel trajectory of another vehicle, and the camera road division line CL and the map road division line ML (Step S104). Next, the travelable region generation unit 134 calculates whether or not both of the camera road division line CL and the map road division line ML are unreliable based on the calculated deviations (Step S106). When it is determined that both of the camera road division line CL and the map road division line ML are unreliable, the travelable region generation unit 134 stops autonomous driving and causes the occupant to perform manual driving of the subject vehicle M.

On the other hand, when it is determined that at least one of the camera road division line CL and the map road division line ML is reliable, the travelable region generation unit 134 determines whether or not the camera road division line CL is reliable (Step S110). When it is determined that the camera road division line CL is reliable, the travelable region generation unit 134 prioritizes the camera road division line CL to generate the travelable region (Step S112). On the other hand, when it is determined that the camera road division line CL is not reliable, the travelable region generation unit 134 prioritizes the map road division line ML to generate the travelable region (Step S114). The processing of this flow chart is finished in this manner.

According to the embodiment given above, when a deviation between the camera road division line and the map road division line has occurred, the travelable region is generated by prioritizing one of the camera road division line and the map road division line based on a camera deviation representing a deviation between the travel trajectory of another detected vehicle and the camera road division line and a map deviation between the travel trajectory and the map road division line. In this manner, it is possible to appropriately select the travel path of a vehicle even when a deviation between a camera road division line and a map road division line has occurred.

The embodiment described above can be represented in the following manner.

A vehicle control device including a storage medium storing computer-readable commands, and a processor connected to the storage medium, the processor being configured to execute the computer-readable commands to: acquire a camera image obtained by photographing a surrounding situation of a vehicle; generate a travelable region, which is a region in which the vehicle is capable of traveling, based on at least one of a camera road division line representing a road division line shown in the camera image and a map road division line representing a road division line stored in map information; detect a travel trajectory of another vehicle traveling ahead of the vehicle with respect to a travel direction of the vehicle; and control traveling of the vehicle such that the vehicle travels in the travelable region, in which when a deviation between the camera road division line and the map road division line has occurred, the processor prioritizes one of the camera road division line and the map road division line to generate the travelable region based on a camera deviation representing a deviation between the detected travel trajectory and the camera road division line and a map deviation between the detected travel trajectory and the map road division line.

As described above, a mode for implementing the present invention has been described using the embodiments, but the present invention is not limited to such embodiments at all, and various modifications and replacements can be added within a range not departing from the gist of the present invention.

What is claimed is:

1. A vehicle control device comprising a storage medium storing computer-readable commands, and a processor connected to the storage medium, the processor being configured to execute the computer-readable commands to:

acquire a camera image obtained by photographing a surrounding situation of a vehicle;

generate a travelable region, which is a region in which the vehicle is capable of traveling, based on one of a camera road division line representing a road division line shown in the camera image and a map road division line representing a road division line stored in map information;

detect travel trajectories of a plurality of other vehicles traveling ahead of the vehicle with respect to a travel direction of the vehicle; and control traveling of the vehicle such that the vehicle travels in the travelable region, wherein in response to a deviation between the camera road division line and the map road division line having occurred, the processor compares a camera deviation representing an average value of first deviations between the travel trajectories and the camera road division line with a map deviation representing an average value of second deviations between the travel trajectories and the map road deviation line, prioritizes the map road division line in response to determining that the camera deviation is larger than the map deviation by a first threshold value or more, or prioritizes the camera road division line in response to determining that the map deviation is larger than the camera deviation by a second threshold value or more, and generates a travelable region based on one of the camera road division line and the map road line.

2. The vehicle control device according to claim 1, wherein in response to a period in which the map road division line is prioritized having continued for a predetermined period, the processor generates the travelable region based on the map road division line without using the camera road division line.

3. The vehicle control device according to claim 1, wherein in response to a period in which the camera road division line is prioritized having continued for a predetermined period, the processor decreases a driving assistance level of the vehicle or increases a driving task imposed on a driver of the vehicle, or whereas in response to a period in which the map road division line is prioritized having continued for a predetermined period, the processor maintains the driving assistance level or the driving task.

4. The vehicle control device according to claim 1, wherein the processor calculates first angles formed by the travel trajectories and the camera road division line as the deviations between the travel trajectories and the camera road division line, and calculates second angles formed by the travel trajectories and the map road division line as the deviations between the travel trajectories and the map road division line.

5. The vehicle control device according to claim 4, wherein the processor calculates, as one of the deviations between the travel trajectories and the camera road division line, a larger one of angles formed by the travel trajectories and the camera road division lines on both sides, and calculates, as one of the deviations between the travel trajectories and the map road division line, a larger one of angles formed by the travel trajectory and the map road division lines on both sides.

6. The vehicle control device according to claim 1, wherein the processor determines which one of the camera road division line and the map road division line to prioritize based on the camera deviation and the map deviation calculated for another vehicle closest to the vehicle with respect to the travel direction of the vehicle among the plurality of other vehicles for which the travel trajectory has been detected.

7. The vehicle control device according to claim 1, wherein in response to a deviation between the camera road division line and the map road division line having occurred and the vehicle existing in a specific area, the processor determines which one of the camera road division line and the map road division line to prioritize based on the camera deviation and the map deviation.

8. The vehicle control device according to claim 1, wherein the processor determines reliability of the camera road division line and reliability of the map road division line independently of each other, and determines which one of the camera road division line and the map road division line to prioritize according to a result of the reliability.

9. A vehicle control method to be executed by a computer, the vehicle control method comprising:

acquiring a camera image obtained by photographing a surrounding situation of a vehicle;

generating a travelable region, which is a region in which the vehicle is capable of traveling, based on one of a camera road division line representing a road division line shown in the camera image and a map road division line representing a road division line stored in map information;

detecting travel trajectories of a plurality of other vehicles traveling ahead of the vehicle with respect to a travel direction of the vehicle;

controlling traveling of the vehicle such that the vehicle travels in the travelable region; and in response to a deviation between the camera road division line and the map road division line having occurred, comparing a camera deviation representing an average value of first deviations between the travel trajectories and the camera road division line with a map deviation representing an average value of second deviations between the travel trajectories and the map road deviation line, prioritizing the map road division line in response to determining that the camera deviation is larger than the map deviation by a first threshold value or more, or prioritizing the camera road division line in response to determining that the map deviation is larger than the camera deviation by a second threshold value or more, and generating a travelable region based on one of the camera road division line and the map road line.

10. A non-transitory computer-readable storage medium storing a program for causing to a computer to:

acquire a camera image obtained by photographing a surrounding situation of a vehicle;

generate a travelable region, which is a region in which the vehicle is capable of traveling, based on one of a camera road division line representing a road division line shown in the camera image and a map road division line representing a road division line stored in map information;

detect travel trajectories of a plurality of other vehicles traveling ahead of the vehicle with respect to a travel direction of the vehicle; and control traveling of the vehicle such that the vehicle travels in the travelable region;

wherein in response to a deviation between the camera road division line and the map road division line having occurred, the computer compares a camera deviation representing an average value of first deviations between the travel trajectories and the camera road division line with a map deviation representing an average value of second deviations between the travel trajectories and the map road deviation line, prioritizes the map road division line in response to determining that the camera deviation is larger than the map deviation by a first threshold value or more, or prioritizes the camera road division line in response to determining that the map deviation is larger than the camera deviation by a second threshold value or more, and generates a travelable region based on one of the camera road division line and the map road line.

* * * * *